United States Patent
Eggert et al.

(10) Patent No.: US 10,436,475 B2
(45) Date of Patent: Oct. 8, 2019

(54) SYSTEM AND METHOD FOR FASTENING A HEATING OR COOLING BODY

(71) Applicant: Zehnder Group International AG, Granichen (CH)

(72) Inventors: Dominik Eggert, Zurich (CH); Jorg Evertz, Birmensdorf (CH); Martin Muller, Schonenberg (CH); Uwe Werner, Hutten (CH); Roland Diethelm, Winterthur (CH)

(73) Assignee: Zehnder Group International AG, Granichen (CH)

( * ) Notice: Subject to any disclaimer, the term of this patent is extended or adjusted under 35 U.S.C. 154(b) by 304 days.

(21) Appl. No.: 15/101,048

(22) PCT Filed: Dec. 2, 2014

(86) PCT No.: PCT/IB2014/002625
§ 371 (c)(1),
(2) Date: Nov. 28, 2016

(87) PCT Pub. No.: WO2015/082974
PCT Pub. Date: Jun. 11, 2015

(65) Prior Publication Data
US 2017/0074543 A1  Mar. 16, 2017

(30) Foreign Application Priority Data
Dec. 2, 2013 (CH) ..................... 2044/13

(51) Int. Cl.
*F24D 19/02* (2006.01)
*F24F 13/30* (2006.01)
(Continued)

(52) U.S. Cl.
CPC .............. *F24F 13/30* (2013.01); *B23P 15/26* (2013.01); *F24D 19/023* (2013.01);
(Continued)

(58) Field of Classification Search
CPC ..................................................... F24D 19/023
(Continued)

(56) References Cited

U.S. PATENT DOCUMENTS

| 1,224,916 A | * | 5/1917 | Fowler | F24D 19/02 248/232 |
| 1,300,817 A | * | 4/1919 | Cochrane | F24D 19/02 248/232 |

(Continued)

FOREIGN PATENT DOCUMENTS

| CA | 2826995 A1 | 8/2012 |
| CA | 2798892 A1 | 7/2013 |

(Continued)

OTHER PUBLICATIONS

International Search Report dated May 24, 2016 for PCT/IB2016/000041.

(Continued)

*Primary Examiner* — Terrell L McKinnon
*Assistant Examiner* — Michael McDuffie
(74) *Attorney, Agent, or Firm* — Maxwell L. Minch; GrayRobinson, P.A.

(57) ABSTRACT

The invention relates to a system and method for fastening a heating/cooling element (3) to a wall or to a floor, the method comprising the following steps:
a) fastening at least two brackets (1, 2) to a wall (W) and/or to a floor (B), the longitudinal axis (L) of each bracket (1, 2) being vertically oriented and the two brackets (1, 2) being spaced apart from one another in the horizontal direction;
b) bringing a first (lower) edge formation of the heating/cooling element into engagement with the complementary first bracket formation (F1) of the particular bracket (1, 2), so that a pivoting engagement between the heating/cooling element (3) and the brackets (1, 2) is established;

(Continued)

c) pivoting the heating/cooling element (3) with respect to the two brackets (1, 2) about a pivot axis (R), a second (upper) edge formation of the heating/cooling element being swiveled toward the second bracket formation (F2) of the particular bracket (1, 2); and d) bringing the second (upper) edge formation of the heating/cooling element (3) into engagement with the complementary second bracket formation (F2) of the particular bracket (1, 2), so that a locking engagement between the heating/cooling element (3) and the brackets (1, 2) is established.

15 Claims, 12 Drawing Sheets

(51) Int. Cl.
  *B23P 15/26*  (2006.01)
  *F25D 23/00*  (2006.01)
(52) U.S. Cl.
  CPC ..... *F24D 19/0209* (2013.01); *F24D 19/0256* (2013.01); *F24D 19/0276* (2013.01); *F24D 19/0283* (2013.01); *F25D 23/006* (2013.01)
(58) Field of Classification Search
  USPC .. 248/644, 209, 213, 213.4, 220.21, 222.13, 248/222.51, 222.52, 223.41, 224.7, 248/225.21, 232, 233, 234
  See application file for complete search history.

(56) References Cited

U.S. PATENT DOCUMENTS

| | | | |
|---|---|---|---|
| 1,428,767 A * | 9/1922 | Farley | F24D 19/02 248/234 |
| 1,666,866 A * | 4/1928 | Ruff | F24D 19/02 248/234 |
| 1,682,486 A * | 8/1928 | Conroy | F24D 19/02 248/232 |
| 1,811,538 A * | 6/1931 | Davis | F24D 19/02 248/233 |
| 1,821,084 A * | 9/1931 | Appel | F24D 19/02 248/233 |
| 1,879,519 A * | 9/1932 | Ruff | F24D 19/02 248/233 |
| 1,887,031 A * | 11/1932 | Lyon | F24D 19/02 248/233 |
| 1,906,591 A * | 5/1933 | Hickey | F24D 19/02 248/233 |
| 1,907,450 A * | 5/1933 | Shipp | F24D 19/06 165/54 |
| 2,187,984 A * | 1/1940 | Moore | F24D 19/02 248/234 |
| 2,195,540 A * | 4/1940 | Owens | F24D 19/02 248/234 |
| 2,788,948 A * | 4/1957 | Pardee | F24D 19/02 248/234 |
| 3,367,412 A | 2/1968 | Hagensick | F24D 19/04 165/56 |
| 3,398,786 A * | 8/1968 | McNabney | F24D 19/04 165/55 |
| 3,844,515 A * | 10/1974 | Knol | F22B 37/20 122/510 |
| 4,416,561 A * | 11/1983 | Fischer | B25B 13/48 248/231.91 |
| 4,685,848 A * | 8/1987 | Langer | B25B 13/00 411/378 |
| 6,951,242 B1 | 10/2005 | Champs et al. | |
| 6,953,510 B1 | 10/2005 | Mackay et al. | |
| 7,398,847 B2 * | 7/2008 | Schmitt | B60K 11/04 180/68.4 |
| 7,506,851 B1 * | 3/2009 | Tooze | F24D 19/02 165/67 |
| 7,572,321 B2 | 8/2009 | Yamakawa et al. | |
| 7,703,730 B2 * | 4/2010 | Best, Jr. | F01P 3/18 165/41 |
| 7,861,988 B2 * | 1/2011 | Hamida | B60K 11/04 180/68.4 |
| 7,950,443 B2 * | 5/2011 | Rasset | F28D 1/0435 165/140 |
| 8,936,668 B2 | 1/2015 | Huizing et al. | |
| 9,216,405 B1 | 12/2015 | Tan et al. | |
| 9,429,366 B2 | 8/2016 | DuBois | |
| 9,562,726 B1 | 2/2017 | Eplee | |
| 2003/0012676 A1 | 1/2003 | Quick et al. | |
| 2003/0056884 A1 | 3/2003 | Belding et al. | |
| 2003/0106680 A1 | 6/2003 | Serpico et al. | |
| 2006/0090650 A1 | 5/2006 | Yamakawa et al. | |
| 2009/0314480 A1 | 12/2009 | Grinbergs et al. | |
| 2010/0032145 A1 | 2/2010 | Lee | |
| 2010/0247404 A1 | 9/2010 | Ptak et al. | |
| 2011/0259572 A1 | 10/2011 | Muratani et al. | |
| 2012/0073791 A1 | 3/2012 | DuBois | |
| 2013/0269906 A1 | 10/2013 | Riendeau | |
| 2013/0299121 A1 | 11/2013 | Ahn et al. | |
| 2014/0014289 A1 | 1/2014 | Tan | |
| 2014/0262125 A1 | 9/2014 | Erb et al. | |

FOREIGN PATENT DOCUMENTS

| | | |
|---|---|---|
| DE | 242946 | 12/1975 |
| DE | 1455863 B2 | 3/1977 |
| DE | 3430204 A1 | 2/1986 |
| DE | 19756346 A1 | 6/1999 |
| DE | 10160217 A1 | 6/2003 |
| DE | 102010054965 A1 | 6/2012 |
| DE | 202012006316 U1 | 8/2012 |
| EP | 0324043 B1 | 9/1991 |
| EP | 0726441 B1 | 10/1999 |
| EP | 1134510 A1 | 9/2001 |
| EP | 2444755 | 4/2012 |
| EP | 2508814 A1 | 10/2012 |
| EP | 2767777 A1 | 8/2014 |
| EP | 2875950 A1 | 5/2015 |
| EP | 3022508 | 3/2017 |
| FR | 1165665 A | 10/1958 |
| FR | 1254959 A | 3/1961 |
| FR | 1524335 A | 5/1968 |
| FR | 2313651 A | 12/1976 |
| FR | 3000189 A1 | 6/2014 |
| GB | 2439557 A | 1/2008 |
| GB | 2455639 A | 6/2009 |
| JP | 2000111279 A | 4/2000 |
| JP | 6186595 B2 | 8/2017 |
| WO | 2001027552 A1 | 4/2001 |
| WO | 2002072242 A1 | 9/2002 |
| WO | 2004110132 A2 | 12/2004 |
| WO | 2013091099 A1 | 6/2013 |
| WO | 2014014099 A1 | 1/2014 |
| WO | 2015011543 A1 | 1/2015 |
| WO | 2015011544 A1 | 1/2015 |

OTHER PUBLICATIONS

International Search Report dated Sep. 13, 2016 for PCT/IB2016/051512.

* cited by examiner

SYSTEM AND METHOD FOR FASTENING A HEATING OR COOLING BODY

The invention relates to a system and a method for fastening a heating or cooling element.

Numerous systems are known for fastening a heating/cooling element to a wall or to a floor. Systems of this type, which are used in panel radiators, for example, contain at least two brackets which may be fastened to a wall or to a floor. The brackets each have a longitudinal axis which extends through a first bracket end and a second bracket end of the particular bracket. The first bracket end of such a bracket has a first bracket formation, and the second bracket end of such a bracket has a second bracket formation. The heating/cooling element to be fastened has a first edge, and a second edge opposite from the first edge. The first edge has a first edge formation which is complementary to the first bracket formation and which may be brought into engagement with the first bracket formation. The second edge has a second edge formation which is complementary to the second bracket formation and which may be brought into engagement with the second bracket formation. In this way, the heating/cooling element may be fastened to the two brackets which have previously been fastened to the wall or to the floor.

In the known systems, after the brackets have been fastened to the wall or to the floor, installation of a heating/cooling element or cooling element still requires numerous steps for fastening the heating/cooling element to the brackets. Installers often find this to be laborious.

The object of the invention is to simplify the installation of a heating or cooling element on a wall or on the floor. In the following discussion, the wording "heating/cooling element" is used instead of "heating or cooling element," meaning that this element is in heating operation or in cooling operation, depending on the temperature of the heat transfer fluid conducted therein relative to the temperature of the surrounding space.

For achieving this object, the invention provides a system for fastening a heating/cooling element having the design described at the outset, having a first edge and a second edge opposite from the first edge, both of which are fixedly mounted on the heating/cooling element or which are in one piece with same, and in which according to the invention the first bracket formation may be brought into a pivoting engagement with the complementary first edge formation of the heating/cooling element, so that the bracket with its first bracket end is pivotable with respect to the heating/cooling element about a pivot axis within a plane that is orthogonal to the main plane of the heating/cooling element; and in which the second bracket formation may be brought into a locking engagement with the complementary second edge formation of the heating/cooling element, so that the bracket with its second bracket end may be engaged with the heating/cooling element.

This system allows a simple method for fastening a heating/cooling element to a wall, with the following steps:

a) fastening at least two brackets to a wall or to a floor, the longitudinal axis of each bracket being vertically oriented and the two brackets being spaced apart from one another in the horizontal direction;

b) bringing the first edge formation of the heating/cooling element into engagement with the complementary first bracket formation of the particular bracket, so that a pivoting engagement between the heating/cooling element and the brackets is established;

c) pivoting the heating/cooling element with respect to the two brackets about a pivot axis, the second edge formation of the heating/cooling element being swiveled toward the second bracket formation of the particular bracket; and d) bringing the second edge formation of the heating/cooling element into engagement with the complementary second bracket formation of the particular bracket, so that a locking engagement between the heating/cooling element and the brackets is established.

In one preferred embodiment of the system according to the invention, the first bracket formation has a hook, and the first edge has a strip on which the hook may be hung and pivoted at a selectable, preferably arbitrary location along the longitudinal direction of the strip. This hook/strip engagement between the bracket and the heating/cooling element may be easily established. The hook and the strip may be provided either on the bottom side or on the top side of the bracket and of the heating/cooling element. According to the invention, a bracket with a hook is also understood to mean an essentially L-shaped bracket in which the actual hook is mounted on the outer end of the short L leg.

The second bracket formation preferably has an extension, and the second edge has a slide which is supported so that it is displaceable along its longitudinal direction, and with which the extension may be engaged. Each slide corresponds to a bracket, and may be positioned at a suitable location on the second edge which corresponds to the location of the first edge on which the hook of the bracket has been hung in position. Selected locations on the first edge and corresponding locations on the second edge are advantageously identified by suitable markings on the two edges. This simplifies the correct positioning of the brackets with their hook end on the first edge, and the corresponding correct positioning of the two slides on the second edge, thus facilitating engagement of the extension of the particular bracket with the particular slide.

The extension preferably has a plate-like or disk-like engagement area which is insertable into a complementary recess in the slide and is engageable therein. This allows an overall flat design of the entire heating/cooling element/bracket system.

In another preferred embodiment of the system according to the invention, the extension is situated on the bracket in an infinitely adjustable manner. The extension is preferably mounted on the second bracket end by means of a screw connection. This allows the distance between the heating/cooling element and a particular bracket to be adjusted, so that for a wall-mounted system, the distance of the heating/cooling element, which is mounted or to be mounted, from the wall may be adjusted. The axis of the screw connection may extend orthogonally with respect to the longitudinal axis or the longitudinal direction of the bracket, and orthogonally with respect to the pivot axis of the bracket.

The brackets of the system according to the invention may have a first wall fastening means and a second wall fastening means, which are situated at a distance from one another along the longitudinal axis of the particular bracket. This type of bracket allows the heating/cooling element to be fastened to a wall.

The brackets of the system according to the invention may have a wall fastening means at a location on their longitudinal axis, and a floor fastening means in the area of their first end. This type of bracket allows the heating/cooling element to be fastened to a wall and to the floor.

Further advantages, features, and possible applications of the invention result from the following description of one exemplary embodiment of the invention, which is not to be construed as limiting, with reference to the drawings, which show the following.

Figure 1:
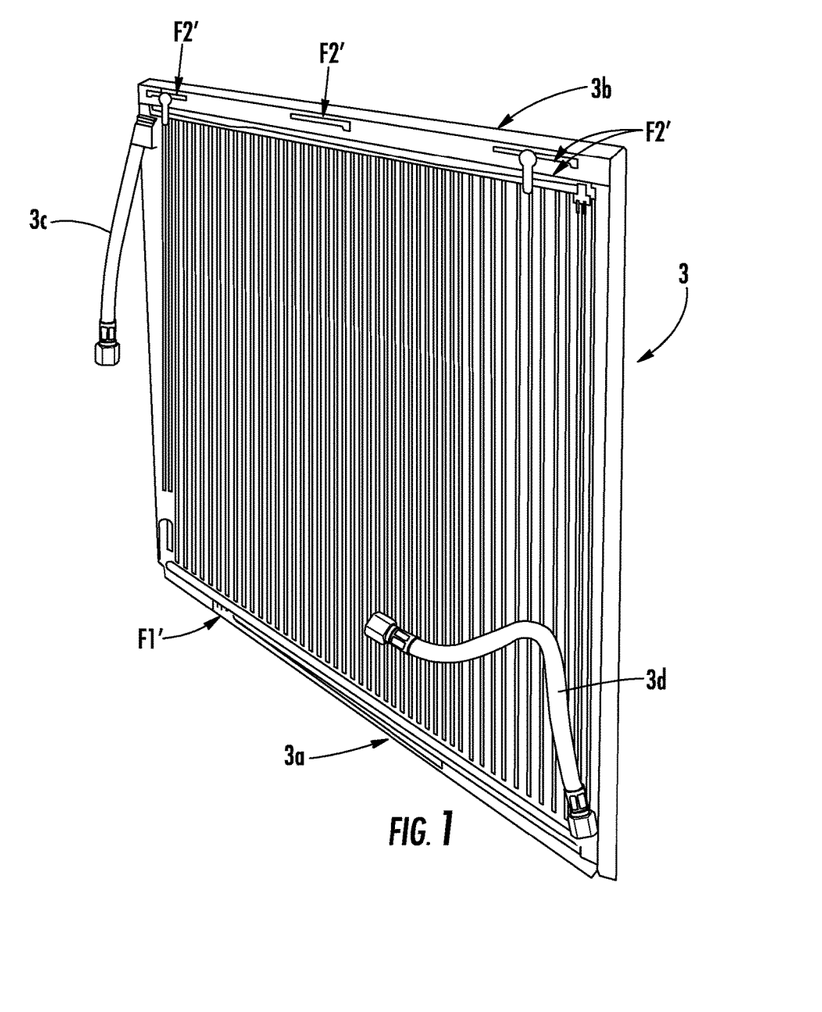
FIG. 1 shows a heating/cooling element which may be fastened to a wall by means of the system according to the invention.

FIG. 1 shows a heating/cooling element 3 which may be fastened to a wall by means of the system according to the invention. More precisely, the rear side, i.e. the side of the heating/cooling element 3 facing the wall in the installed state, is shown. The heating/cooling element 3 has a first edge 3a and a second edge 3b opposite therefrom, both of which are fixedly mounted on the heating/cooling element 3 or which are in one piece with the same. The heating/cooling element 3 also has a first connection to which a first hose 3c is connected, and a second connection to which a second hose 3d is connected. A first edge formation F1 is situated in the area of the first edge 3a, and a second edge formation F2' is situated in the area of the second edge 3b. In the illustrated example of a heating/cooling element 3, the heating/cooling element has one or more strip-like formations F1' in the area of the first edge 3a, and has one or more groove-like formations F2' in the area of the second edge 3b, each extending in parallel to the edges 3a, 3b. In the illustrated example, the lower formation F1' is a strip which extends over the entire width of the heating/cooling element 3, while the upper formation F2' is formed by three grooves which are uniformly distributed over the width of the heating/cooling element 3.

Figures 2, 3:
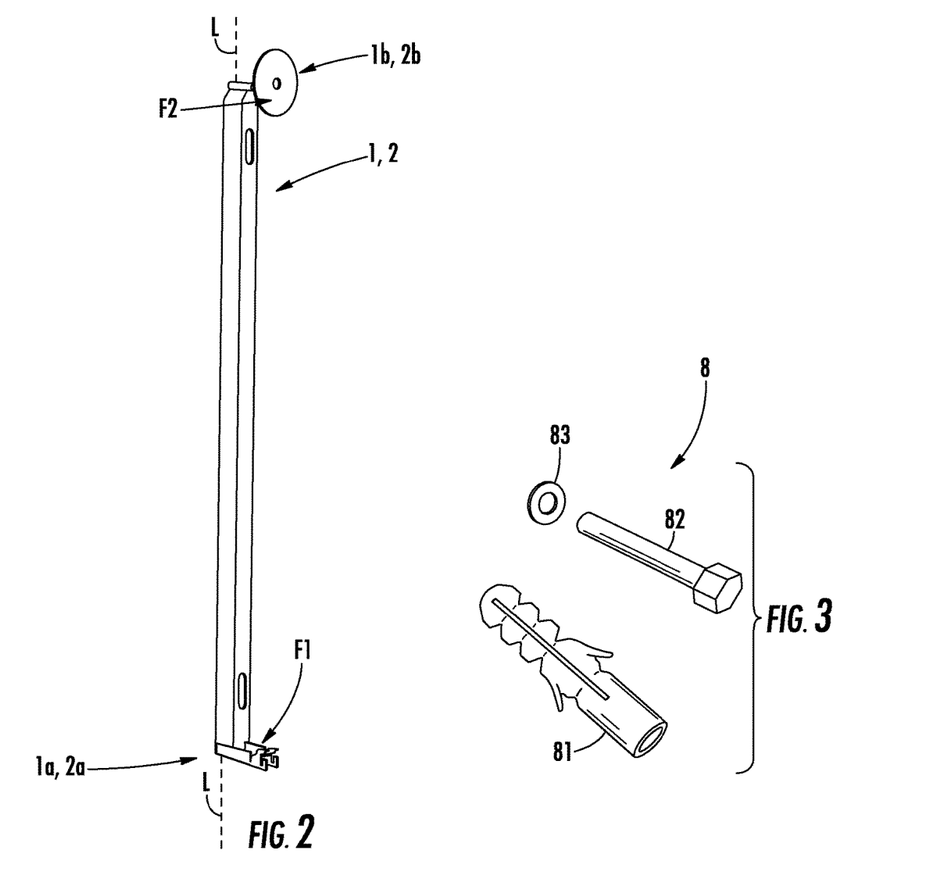
FIG. 2 shows a bracket which forms an integral component of the system according to the invention.
FIG. 3 shows fastening means which are used with the system according to the invention.

FIG. 2 shows a bracket 1 (or 2) which forms an integral component of the system according to the invention. The system comprises at least two brackets 1, 2, each having a longitudinal axis L which extends through a first bracket end 1a (or 2a) and a second bracket end 1b (or 2b) of the particular bracket 1 (or 2). The first bracket end 1a, 2a in each case has a first bracket formation F1, and the second bracket end 1b, 2b in each case has a second bracket formation F2.

The first edge 3a has a first edge formation F1', complementary to the first bracket formation F1, which may be brought into engagement with the first bracket formation F1. The second edge 3b has a second edge formation F2', complementary to the second bracket formation F2, which may be brought into engagement with the second bracket formation F2.

Figure 25:
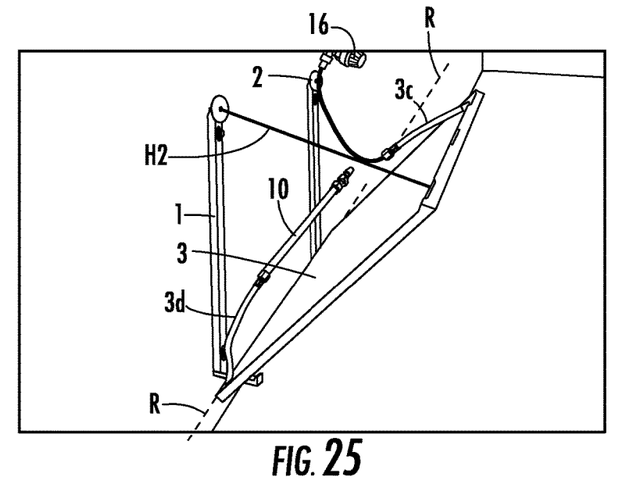
FIG. 25 shows the connection of the return line without an extension tube.
Figure 26:
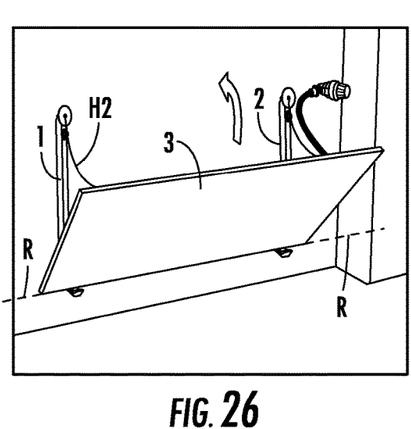
FIG. 26 shows the swiveling up of the heating/cooling element about the pivot axis.

The first bracket formation F1 may be brought into a pivoting engagement with the complementary first edge formation F1' of the heating/cooling element 3, so that the particular bracket 1, 2 with its first bracket end 1a, 2a is pivotable with respect to the heating/cooling element 3 about a pivot axis R within a plane that is orthogonal to the main plane of the heating/cooling element 3 (see FIGS. 25 and 26).

The second bracket formation F2 may be brought into a locking engagement with the complementary second edge formation F2 of the heating/cooling element 3, so that the particular bracket 1, 2 with its second bracket end 1b, 2b may be engaged with the heating/cooling element 3.

FIG. 3 shows fastening means 8 which are used with the system according to the invention. Two dowels 81, two screws 82, and two washers 83 are provided for each of the two brackets 1, 2 for fastening the particular bracket 1, 2 to a wall.

Figure 4:
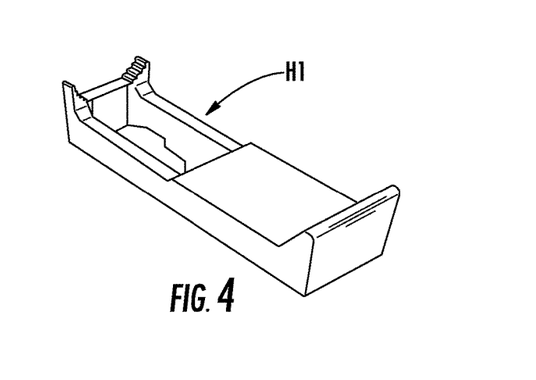
FIG. 4 shows a first mounting aid which is used with the system according to the invention.

FIG. 4 shows a first mounting aid H1, which is used with the system according to the invention. A first mounting aid H1 of this type is provided for each of the two brackets 1, 2 (see FIG. 18).

Figure 5:
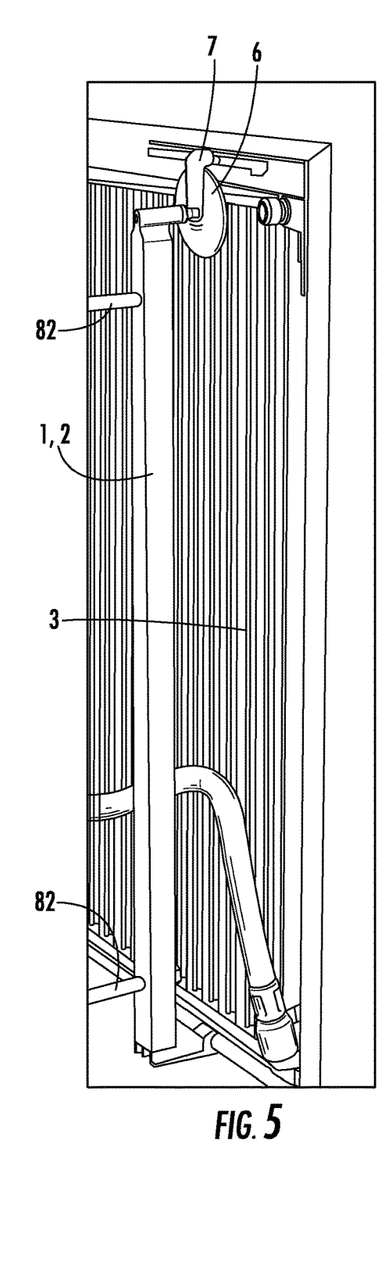
FIG. 5 shows a detail of a heating/cooling element which is fastened by means of a bracket.

FIG. 5 shows a detail of a heating/cooling element 3, which is fastened by means of a bracket 1, 2.

Figure 6:
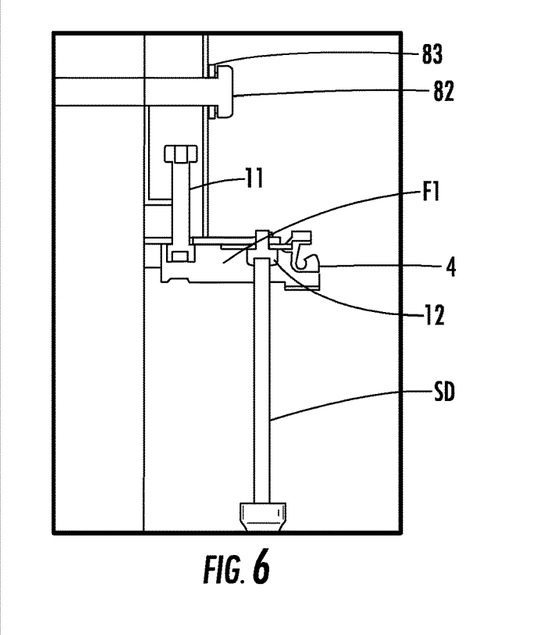
FIG. 6 shows an enlarged detail of the lower area of FIG. 5 in the form of a sectional view.

FIG. 6 shows an enlarged detail of the lower area from FIG. 5. The lower end area of the bracket 1, 2 is discernible. It is apparent that the first bracket formation F1 has a hook 4. The first edge 3a (see FIG. 1) has a strip 5 on which the hook 4 may be hung and pivoted at a selectable location along the longitudinal direction of the strip 5 (see FIGS. 21 and 22). Also apparent are a screw 82 and a washer 83 by means of which the bracket 1, 2 is fastened to a wall. Also apparent is a first additional screw 11, which may be infinitely turned on the bracket 1, 2 for height adjustment, and which is used for adjusting the height of the hung heating/cooling element 3. Also apparent is a second additional screw 12, which may be loosened on the bracket 1, 2 for adjusting the wall spacing, then retightened. The second additional screw is used for adjusting the distance of the hung heating/cooling element 3 from the wall. The screws 11 and 12 have an indentation on their head with a polygonal profile, and may be turned with an appropriate screwdriver SD. It is apparent how the screw 12 is actuated by the screwdriver SD for adjusting the wall spacing.

Figure 7:
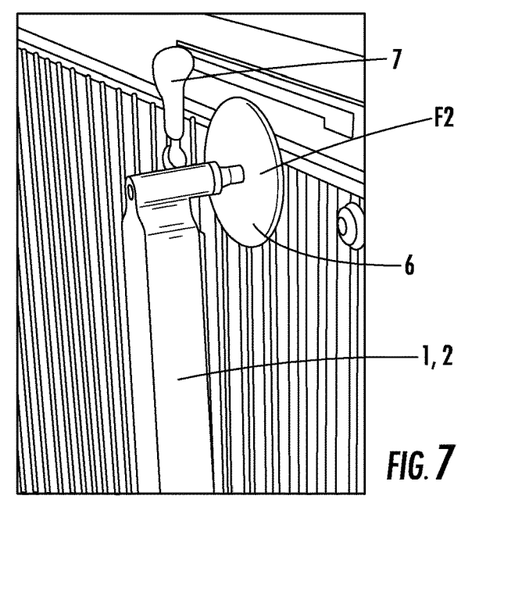
FIG. 7 shows an enlarged detail of the upper area of FIG. 5.

FIG. 7 shows an enlarged detail of the upper area of FIG. 5 in the form of a sectional view. 3. It is apparent that the second bracket formation F2 has an extension 6. The second edge 3b (see FIG. 1) has a slide 7 on which the extension 6 may be engaged, and which is supported so that it is displaceable along its longitudinal direction (see FIGS. 29 and 30).

Figure 8:
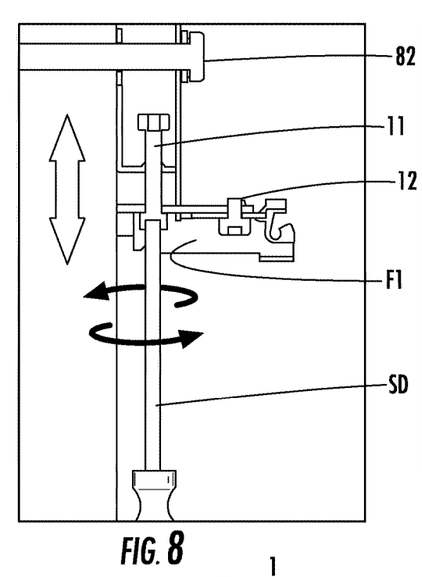
FIG. 8 shows an enlarged detail of the lower area of FIG. 5 in the form of a sectional view.

FIG. 8 once again shows the enlarged detail of the lower area of FIG. 5 in the form of a sectional view. It is apparent how the screw 11 is actuated by the screwdriver SD for adjusting the height.

Figure 9:
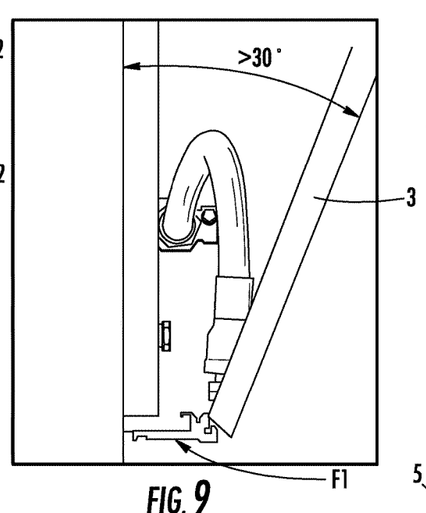
FIG. 9 shows a detail from the lower area of FIG. 5, with the heating/cooling element tilted.

FIG. 9 shows a detail from the lower area of FIG. 5 with the heating/cooling element 3 tilted, and in a pivoted state relative to the brackets 1, 2. The angle shown here of the pivoting of the plane of the heating/cooling element 3 with respect to the vertical, or the longitudinal axis L, of the bracket 1, 2 is 30°. In the tilted position, the heating/cooling element 3 which is pivotably hung on the brackets 1, 2 may be moved to the left or to the right along the wall for lateral adjustment. In the process, a movement of the formations F1 relative to the formations F1 of the heating/cooling element takes place.

Figure 10:
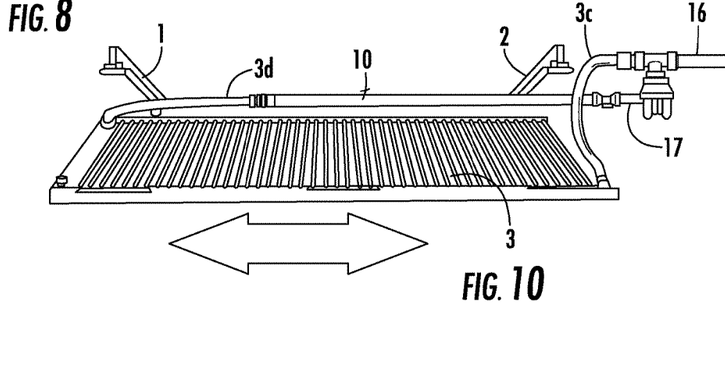
FIG. 10 shows the tilted heating/cooling element of FIG. 9 from the top.

FIG. 10 shows the tilted heating/cooling element 3 from FIG. 9 from the top. The two brackets 1, 2 and the two hoses 3c, 3d at the connections of the heating/cooling element 3 are apparent. Also apparent is a hose or an extension tube 10, which is connected to the hose 3d as an extension. The hoses 3c. 3d and the hose or the extension tube 10 allow the heating/cooling element 3 to be connected under all conceivable connection "boundary conditions." In particular, they allow connection of the heating/cooling element 3 to horizontal supply and return lines on the left side, as shown with reference to the supply line fitting 16 and the return line fitting 17 in FIG. 10, or to horizontal supply and return lines on the right side, to a supply line on the left side and a return line on the right side, to a supply line on the right side and a return line on the left side, to vertical supply and return lines in the middle, beneath the heating/cooling element 3, or to vertical or horizontal supply and return lines in the middle, behind the heating/cooling element 3. The latter variant is characterized in that the supply line and return line connections are concealed by the heating/cooling element 3.

Figure 11:
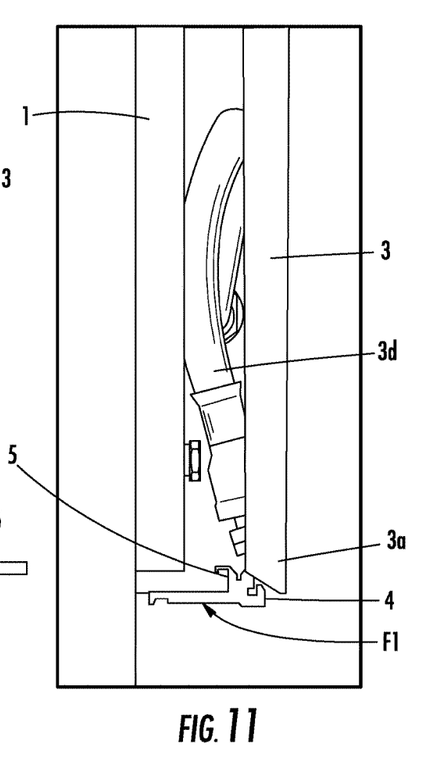
FIG. 11 shows a section of the heating/cooling element in its swiveled-up vertical position.

FIG. 11 shows a section of the heating/cooling element 3 in its swiveled-up vertical position. The hose 3d between the bracket 1 and the heating/cooling element 3 is apparent. Also apparent on the lower/first edge 3a is the strip 5, which is hung on the hook 4 of the lower/first formation F1 of the bracket 1 and is pivotable relative to same.

Figure 12:
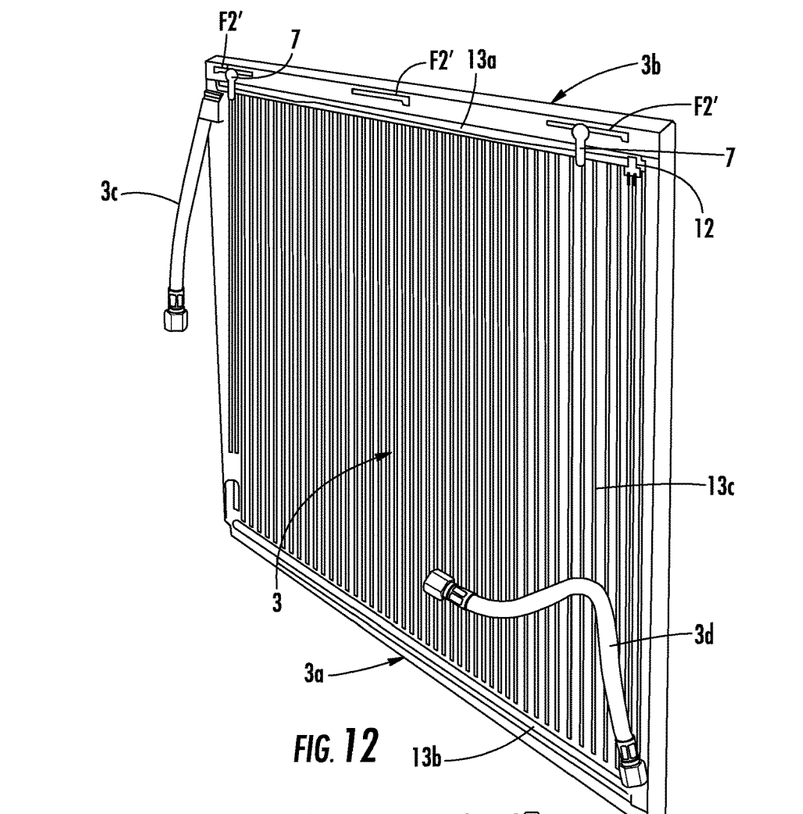
FIG. 12 shows the heating/cooling element depicted in FIG. 1 with a graphically highlighted supply line and return line.

FIG. 12 shows the heating/cooling element 3 depicted in FIG. 1 with a graphically highlighted supply hose 3c and return hose 3d. Also apparent are a vent valve 12 and a tube register 13, which represents an important part of the heating/cooling element 3. The tube register 13 is preferably made of a polymer material. It has a supply line distributor 13a connected downstream at the supply hose 3c, and a return line distributor 13b connected upstream at the return hose 3d. A number of connecting tubes 13c extend in parallel to one another between the supply line distributor 13a and the return line distributor 13b. All line cross-sections of the tube register, i.e. the line cross-section of the supply line distributor 13a, the line cross-section of the return line distributor 13b, and the line cross-sections of all connecting tubes 13c, are circular. As a result, the heating/cooling element 3 has a low mass, is resistant to corrosion, and can withstand high fluid pressures in its interior, for which reason this heating element is also suited for high-rise buildings having central heating/cooling.

Figure 13:
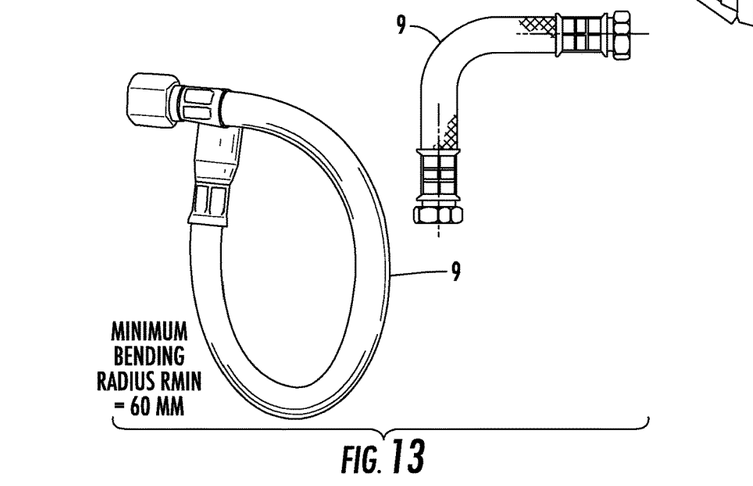
FIG. 13 shows a flexible extension tube or a hose which forms a line section of the supply line and return line of the heating/cooling element.

FIG. 13 shows a flexible tube or a hose 9 which forms a line section of the supply line 3c and the return line 3d of the heating/cooling element 3. The minimum bending radius of this hose 9 is 60 mm.

Figure 14:
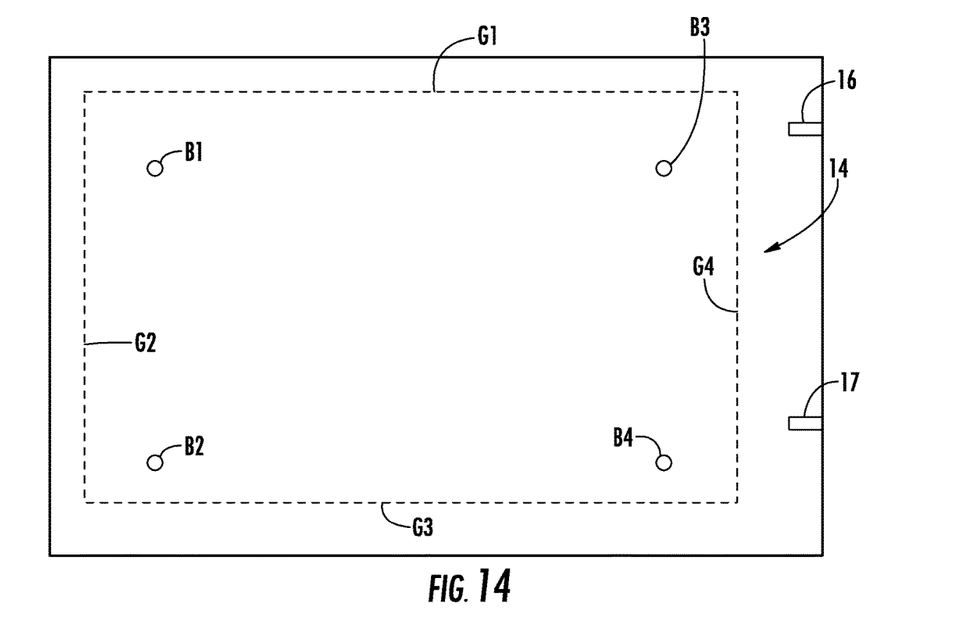
FIG. 14 shows a hole pattern on a wall.

FIG. 14 shows a hole pattern 14 created on a wall prior to the drilling of holes in a step 1. The hole pattern 14 contains four markings B1, B2, B3, B4 that indicate the locations on the wall where holes are to be drilled, and four straight boundary lines G1, G2, G3, G4, illustrated as dashed lines, that indicate the outline of the heating/cooling element to be installed. Also apparent are a supply line fitting 16 and a return line fitting 17.

Figure 15:
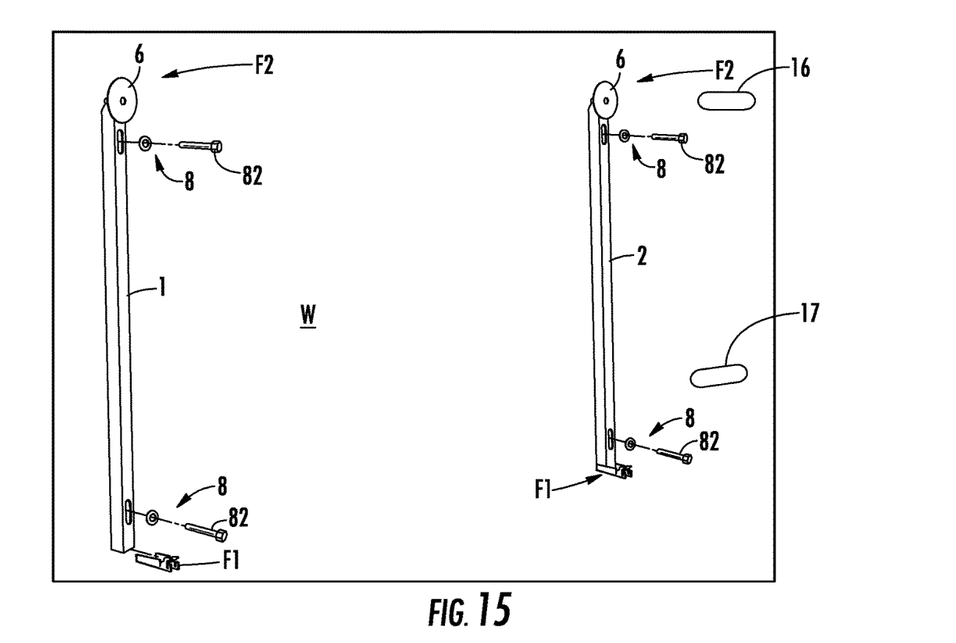
FIG. 15 shows the loose attachment of the two brackets to a wall, using the fastening means.

FIG. 15 shows the loose attachment of the two brackets 1, 2 on a wall W in a step 2, using the fastening means 8. Brackets 1, 2 placed on the wall W in a vertical alignment, with their lower and upper formations F1 and F2, respectively, are apparent. The upper formations F2 of the brackets 1, 2 each have a disk-shaped extension 6. The supply line fitting 16 and the return line fitting 17 are also apparent. The brackets are positioned on the wall, using the fastening means 8. However, the screws 82 of the fastening means 8 are not yet tightened: i.e. the brackets 1, 2 are only loosely positioned on the wall W.

Figure 16:
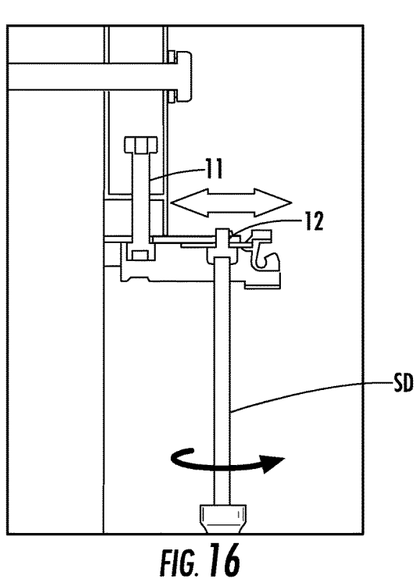
FIG. 16 shows the adjustment of a desired wall spacing in the lower area of the bracket in the form of a sectional view.

FIG. 16 shows the adjustment of a desired wall spacing in the lower area of the bracket 1, 2 in a step 3A, in the form of a sectional view. This view corresponds to FIG. 6.

Figure 17:
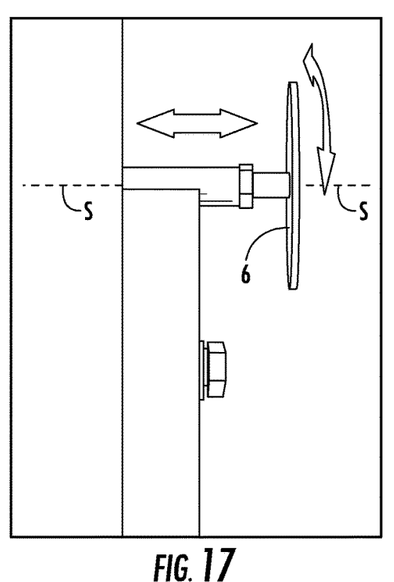
FIG. 17 shows the adjustment of a desired wall spacing in the upper area of the bracket, in the form of a sectional view.

FIG. 17 shows the adjustment of a desired wall spacing in the upper area of the bracket 1, 2 in a step 3B, in the form of a sectional view. The extension 6 in the form of a circular disk is apparent. The extension 6 is situated on the bracket 1, 2 in an infinitely adjustable manner. For this purpose, the extension 6 is mounted on the second, i.e. upper, bracket end 1b, 2b by means of a screw connection. The axis S of the screw connection extends orthogonally with respect to the longitudinal axis L of the bracket 1, 2, and orthogonally with respect to the pivot axis R of the bracket 1, 2.

Figure 18:
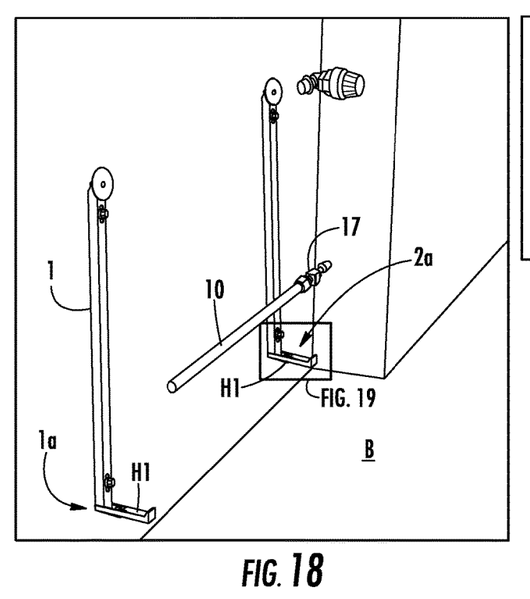
FIG. 18 shows the hanging of the first mounting aids in the lower area of the brackets.

FIG. 18 shows the hanging of the first mounting aids H1 in the lower area of the brackets 1, 2 as step 4. The two brackets 1, 2 with the two attached mounting aids H1, the floor B, and the extension tube 10 attached to the return line fitting 17 are apparent. Each of the two brackets 1, 2 is an L-shaped bracket in which the above-described hook 4 (see FIG. 11) is mounted on the outer end of the short L leg of the bracket 1, 2.

Figure 19:
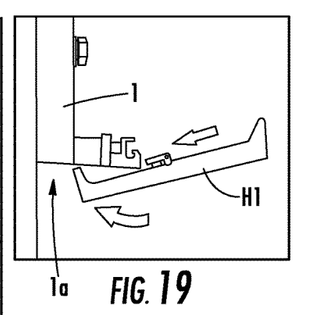
FIG. 19 shows an enlarged detail from FIG. 18 in a side view.

FIG. 19 shows an enlarged detail of FIG. 18 in a side view. It is apparent how the first mounting aid H1 is mounted on the first, i.e. lower, bracket end 1a of the bracket 1, i.e. on the end of the short L leg of the bracket 1. The two arrows indicate that for this purpose, the first mounting aid H1 is initially placed against the end of the L leg and brought into pivoting engagement, and is subsequently rotated about a pivot axis which extends in parallel to the first, i.e. lower, edge 3a of the heating/cooling element 3 (orthogonal to the plane of the drawing) until the mounting aid H1 engages with the short upper leg L in such a way that the upper side of the mounting aid H1 forms an essentially horizontal sliding surface on which the lower edge 3a of the heating/cooling element 3 can slide back and forth in the horizontal direction.

Figure 20:
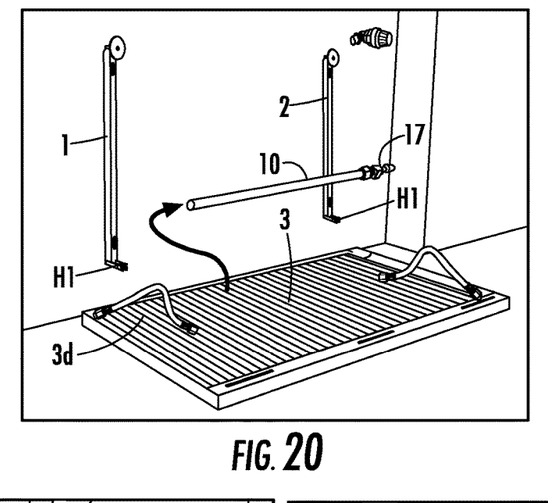
FIG. 20 shows the connection of the return line by means of an extension tube.

FIG. 20 shows the connection of the return line of the heating element 3 by means of the second hose 3d and the extension tube 10, as step 5. The other elements and reference numerals are the same as in FIG. 18.

Figure 21:
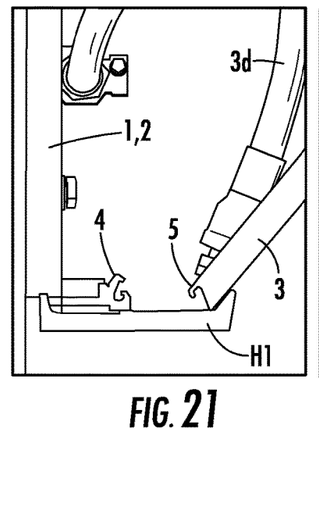
FIG. 21 shows the mounting of the heating/cooling element on a hung mounting aid.

FIG. 21 shows the placement of the heating/cooling element 3 on the hung mounting aids H1 as step 6A. The heating/cooling element 3 is placed at an angle to the vertical, with its lower edge 3a on the top side of the particular mounting aid H1, in such a way that the strip 5 faces the hook 4 on the end of the short L leg of the particular bracket 1, 2.

Figure 22:
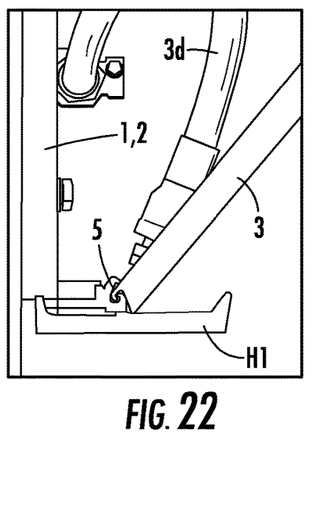
FIG. 22 shows the displacement of the mounted heating/cooling element along the mounting aid.

FIG. 22 shows the displacement of the heating/cooling element 3, placed on the mounting aids H1 in the horizontal direction along the mounting aids H1 as step 6B. The heating/cooling element 3 is slidingly pushed on the mounting aids H1 toward the hook 4 at the end of the short L leg of the particular bracket 1, 2 until the strip 5 comes to rest in the hook 4. The heating/cooling element 3 is now in pivoting engagement with the first, i.e. lower ends 1a, 2a of the brackets 1, 2, and may be pivoted about a pivot axis R which extends in parallel to the lower edge 3a of the heating/cooling element 3 (orthogonal to the plane of the drawing) (see FIGS. 25 and 26).

Figure 23:
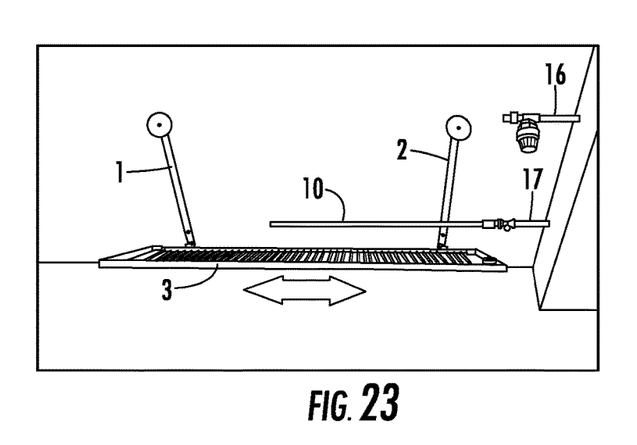
FIG. 23 shows the lateral alignment of the heating/cooling element.

FIG. 23 shows the lateral alignment of the heating/cooling element 3 as step 7. The other elements and reference numerals are the same as in FIG. 18 or FIG. 20.

Figure 24:
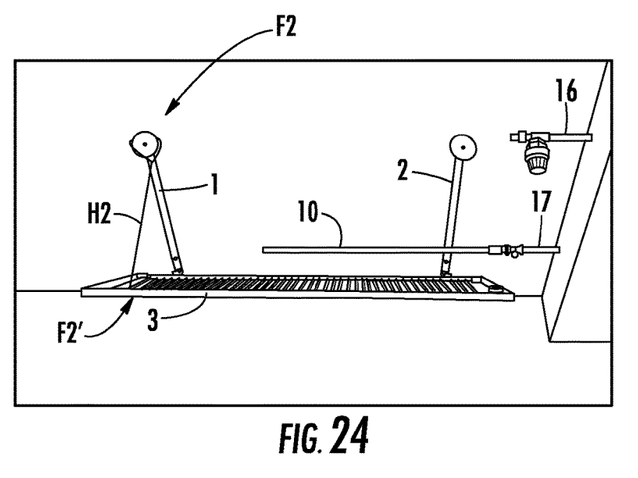
FIG. 24 shows the hanging of a second mounting aid in the upper area of one of the two brackets.

FIG. 24 shows the hanging of a second mounting aid H2 in the upper area of one of the two brackets 1, 2 as step 8. The second mounting aid H2 is a pull cable which is hung on the second bracket formation F2 at the upper end 1a of the bracket 1, and on the second edge formation F2 at the upper edge 3b of the heating/cooling element 3, and then tensioned between these two formations F2 and F2' by the gravitational force of the heating/cooling element 3. The other elements and reference numerals are the same as in FIG. 18 or FIG. 20.

FIG. 25 shows the connection of the supply line by means of the second hose 3d, without the extension tube 10, as step 9. The other elements and reference numerals are the same as in FIG. 18.

FIG. 26 shows the swiveling up of the heating/cooling element 3 about the pivot axis R as step 10. The pull cable of the second mounting aid H2, which was previously tensioned, is hereby loosened. The other elements and reference numerals are the same as in FIG. 18.

Figure 27:
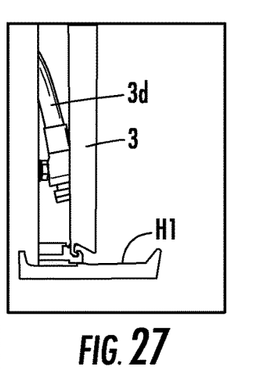
FIG. 27 shows an enlarged detail of the lower area of the heating/cooling element shown in FIG. 26 in the swiveled-up position, in a side view.

FIG. 27 shows an enlarged detail of the heating/cooling element 3 shown in FIG. 26 in the swiveled-up position, in a side view. The horizontally extending first mounting aid H1 and the lower area of the vertically extending heating/cooling element 3 are apparent.

Figure 28:
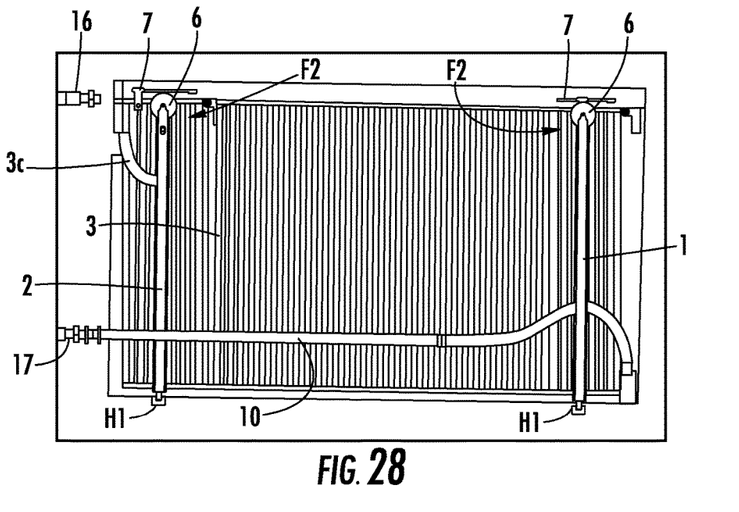
FIG. 28 shows the swiveled-up heating/cooling element according to FIG. 27 from the rear, the heating/cooling element not yet locked in the upper area of the brackets.

FIG. 28 shows the swiveled-up heating/cooling element 3 according to FIG. 27 from the rear in a step 11A, in which the heating/cooling element 3 is not yet locked in the upper area of the brackets 1, 2. Also apparent are the hose 3c, which is directly connected to the supply line fitting 16, and the hose 3d, which is connected to the return line fitting 17 via the extension tube 10. The respective disk-shaped extension 6 of the upper bracket formation F2 of the two brackets 1, 2 rests against the heating/cooling element 3. Situated to the left of each of the two extensions 6, at the upper edge 3b of the heating/cooling element 3, is a slide 7 which is associated in each case with an extension 6, and which is supported on the heating/cooling element 3 so that it is displaceable along the longitudinal direction of the upper edge 3b. Each of the two slides 7 can be moved toward its associated extension 6 and brought into engagement with same. The heating/cooling element 3 in its vertical position may be fastened to the two brackets 1, 2 in this way.

Figure 29:
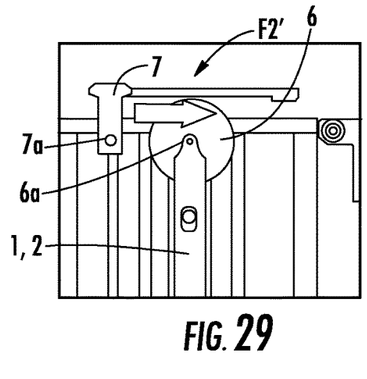
FIG. 29 shows one of the two details of the heating/cooling element from FIG. 28 prior to locking the heating/cooling element.

FIG. 29 shows one of the two details of the heating/cooling element 3 from FIG. 28, prior to locking the heating/cooling element 3. The slide 7, which is horizontally displaceable on the second, i.e. upper, edge 3b of the heating/cooling element 3, has a recess 7a which may be brought into engagement with an engagement area 6a on the disk-shaped extension 6. The engagement area 6a and the recess 7a having a complementary design enter into a locking connection with one another.

Figure 30:
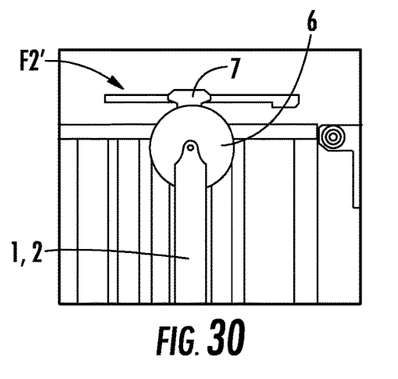
FIG. 30 shows the detail of the heating/cooling element from FIG. 28 after locking the heating/cooling element.

FIG. 30 shows the detail of the heating/cooling element 3 from FIG. 28 after locking the heating/cooling element 3, as step 11B. The slider 7 is now moved along the upper edge 3b of the heating/cooling element 3 toward the extension 6, and engages with the extension 6 of the particular bracket 1, 2, whereby the engagement area 6a and the recess 7a having a complementary design enter into a locking connection with one another.

Figure 31:
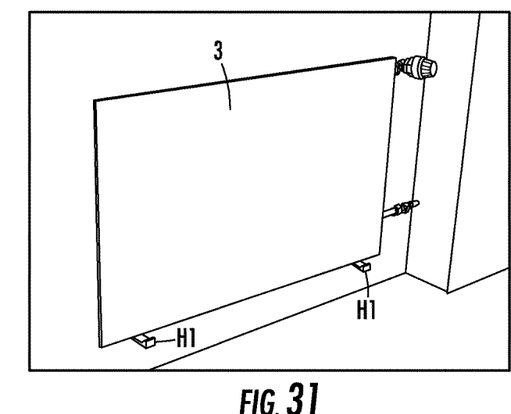
FIG. 31 shows the installed heating/cooling element prior to removal of the first mounting aids.

FIG. 31 shows the installed heating/cooling element 3 prior to removal of the first mounting aids H1. The mounting aids H1 protruding from the lower edge 3a of the heating/cooling element 3 are removed in step 12 by performing the movements of the mounting aids H1, shown and described in FIG. 19, in the reverse order.

Figure 32:
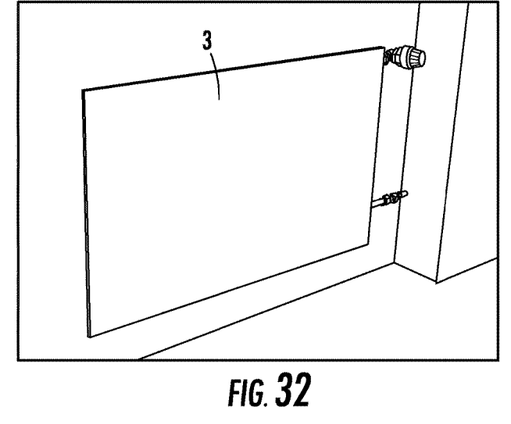
FIG. 32 shows the installed heating/cooling element after removal of the first mounting aids.

FIG. 32 shows the installed heating/cooling element 3 after removal of the first mounting aids H1. The height, i.e. the distance from the floor, as well as the depth, i.e. the distance from the wall, may now be checked and readjusted if necessary in a step 13.

Figure 33:
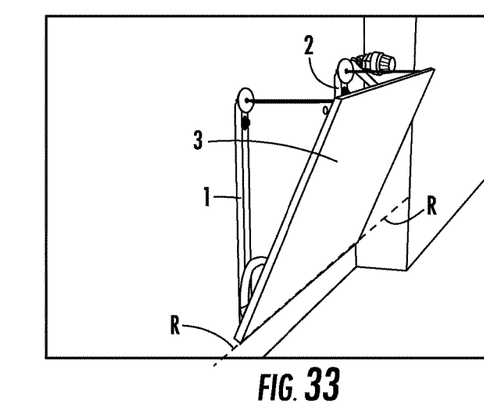
FIG. 33 shows the swiveling down of the heating/cooling element about the pivot axis, and the fixed mounting of the two brackets on the wall, using the fastening means.

FIG. 33 shows the swiveling down once again of the heating/cooling element 3 about the pivot axis R and the fixed attachment of the two brackets 1, 2 to the wall, using the fastening means 8, as step 14. The screws 82 of the fastening means 8 are now tightened, so that the brackets 1, 2 and thus the heating/cooling element 3 are stationarily positioned on the wall W. In this swiveled-down position, the heating/cooling element 3 may also be vented via the vent valve 12. The heating/cooling element 3 may now be swiveled up once again about the pivot axis R for the final time, and the heating/cooling element 3 may once again be locked to the brackets 1, 2 as in steps 11A and 11B.

Figure 34:
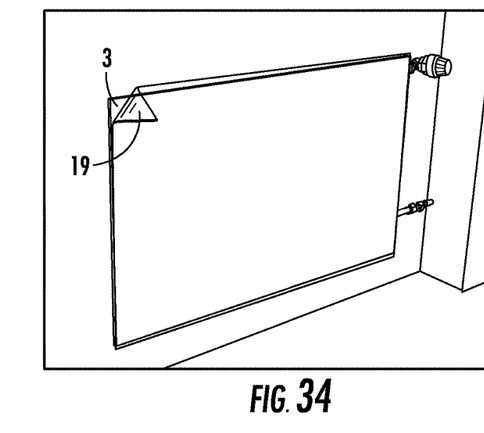
FIG. 34 shows the removal of the protective film from the heating/cooling element installed on the wall.

FIG. 34 shows the removal of a protective film 19 applied to the heating/cooling element 3. The heating/cooling element 3 installed on the wall is now ready for use.

The invention claimed is:

1. A system for fastening a heating/cooling element (3) which has a first edge (3a) and a second edge (3b) opposite from the first edge, both of which are fixedly mounted on the heating/cooling element (3) or which are in one piece with same, wherein the system comprises:
at least two brackets (1, 2), each having a longitudinal axis (L) which extends through a first bracket end (1a, 2a) and a second bracket end (1b, 2b) of the particular bracket (1, 2), the first bracket end (1a, 2a) in each case having a first bracket formation (F1), and the second bracket end (1b, 2b) in each case having a second bracket formation (F2);
wherein the first edge (3a) has a first edge formation (F1') which is complementary to the first bracket formation (F1) and which may be brought into engagement with the first bracket formation (F1), and the second edge (3b) has a second edge formation (F2') which is complementary to the second bracket formation (F2) and which may be brought into engagement with the second bracket formation (F2), wherein the first bracket formation (F1) may be brought into a pivoting engagement with the complementary first edge formation (F1') of the heating/cooling element (3), so that the bracket (1, 2) with its first bracket end (1a, 2a) is pivotable with respect to the heating/cooling element (3) about a pivot axis (R) within a plane that is orthogonal to the main plane of the heating/cooling element (3); and
wherein the second bracket formation (F2) may be brought into a locking engagement with the complementary second edge formation (F2') of the heating/cooling element (3), so that the bracket (1, 2) with its second bracket end (1b, 2b) may be engaged with the heating/cooling element (3), wherein said second bracket formation (F2) has an extension (6), and the second edge (3b) has a slide (7) which is supported so that it is displaceable along its longitudinal direction, and with which the extension (6) may be engaged, and wherein said extension (6) is situated on the bracket (1, 2) in an adjustable manner, and wherein said extension (6) is mounted on the second bracket end (1b, 2b) by means of a screw connection.

2. The system according to claim 1, wherein the first bracket formation (F1) has a hook (4), and the first edge (3a) has a strip (5) on which the hook (4) may be hung and pivoted at a selectable location along the longitudinal direction of the strip (5).

3. The system according to claim 1, wherein the extension (6) has a plate-like or disk-like engagement area (6a) which is insertable into a complementary recess (7a) in the slide (7) and is engageable therein.

4. The system according to claim 1, wherein the axis (S) of the screw connection extends orthogonally with respect to the longitudinal axis (L) of the bracket (1, 2), and orthogonally with respect to the pivot axis (R) of the bracket (1, 2).

5. The system according to claim 1 wherein a bracket (1, 2) has a first wall fastening means (8) and a second wall fastening means (8), which are situated at a distance from one another along the longitudinal axis (L) of the bracket (1, 2).

6. The system according to claim 1 wherein the bracket (1, 2) has a wall fastening means (8) at a location on its longitudinal axis (L), and a floor fastening means in the area of its first end (1a, 2a).

7. The system according to claim 2, wherein the second bracket formation (F2) has an extension (6), and the second edge (3b) has a slide (7) which is supported so that it is displaceable along its longitudinal direction, and with which the extension (6) may be engaged.

8. The system according to claim 3, wherein the extension (6) is situated on the bracket (1, 2) in an adjustable manner.

9. A system for fastening a heating/cooling element (3) which has a first edge (3a) and a second edge (3b) opposite from the first edge, both of which are fixedly mounted on the heating/cooling element (3) or which are in one piece with same, wherein the system comprises:
at least two brackets (1, 2), each having a longitudinal axis (L) which extends through a first bracket end (1a, 2a) and a second bracket end (1b, 2b) of the particular bracket (1, 2), the first bracket end (1a, 2a) in each case having a first bracket formation (F1), and the second bracket end (1b, 2b) in each case having a second bracket formation (F2);
wherein the first edge (3a) has a first edge formation (F1') which is complementary to the first bracket formation (F1) and which may be brought into engagement with the first bracket formation (F1), and the second edge (3b) has a second edge formation (F2') which is complementary to the second bracket formation (F2) and which may be brought into engagement with the second bracket formation (F2), wherein the first bracket formation (F1) may be brought into a pivoting engagement with the complementary first edge formation (F1') of the heating/cooling element (3), so that the bracket (1, 2) with its first bracket end (1a, 2a) is pivotable with respect to the heating/cooling element (3) about a pivot axis (R) within a plane that is orthogonal to the main plane of the heating/cooling element (3); and
wherein the second bracket formation (F2) may be brought into a locking engagement with the complementary second edge formation (F2') of the heating/cooling element (3), so that the bracket (1, 2) with its second bracket end (1b, 2b) may be engaged with the heating/cooling element (3), wherein said second bracket formation (F2) has an extension (6), and the second edge (3b) has a slide (7) which is supported so that it is displaceable along its longitudinal direction, and with which the extension (6) may be engaged, and wherein said extension (6) is situated on the bracket (1, 2) in an adjustable manner, and wherein the extension (6) is mounted on the second bracket end (1b, 2b) by means of a screw connection, and wherein the axis (S) of the screw connection extends orthogonally with respect to the longitudinal axis (L) of the bracket (1, 2), and orthogonally with respect to the pivot axis (R) of the bracket (1, 2).

10. The system according to claim 9, wherein the first bracket formation (F1) has a hook (4), and the first edge (3a) has a strip (5) on which the hook (4) may be hung and pivoted at a selectable location along the longitudinal direction of the strip (5).

11. The system according to claim 9, wherein the extension (6) has a plate-like or disk-like engagement area (6a) which is insertable into a complementary recess (7a) in the slide (7) and is engageable therein.

12. The system according to claim 9 wherein a bracket (1, 2) has a first wall fastening means (8) and a second wall fastening means (8), which are situated at a distance from one another along the longitudinal axis (L) of the bracket (1, 2).

13. The system according to claim 9 wherein the bracket (1, 2) has a wall fastening means (8) at a location on its longitudinal axis (L), and a floor fastening means in the area of its first end (1a, 2a).

14. The system according to claim 10, wherein the second bracket formation (F2) has an extension (6), and the second edge (3b) has a slide (7) which is supported so that it is displaceable along its longitudinal direction, and with which the extension (6) may be engaged.

15. The system according to claim 11, wherein the extension (6) is situated on the bracket (1, 2) in an adjustable manner.

\* \* \* \* \*